United States Patent
Buchhold et al.

[15] 3,668,297
[45] June 6, 1972

[54] LOW-TEMPERATURE ELECTRICAL CABLE ARRANGEMENT

[72] Inventors: Theodor Adam Buchhold, Wiesbaden; Eduard Bochenek, Frankfurt am Main, both of Germany

[73] Assignee: Licentia Patent-Verwaltungs-G.m.b.H., Frankfurt am Main, Germany

[22] Filed: Apr. 14, 1971

[21] Appl. No.: 133,826

[30] Foreign Application Priority Data

Apr. 17, 1970 Germany .....................P 20 18 404.7

[52] U.S. Cl. ...............................174/15 C, 174/13, 174/28, 174/29, 174/126, 174/131 A
[51] Int. Cl. .......................................H01b 7/34, H01b 9/04
[58] Field of Search................174/28, 29, 126 R, 128, 15 C, 174/DIG. 6, 13, 110 FC, 108, 109, 130, 131 A

[56] References Cited

UNITED STATES PATENTS

| | | | |
|---|---|---|---|
| 3,541,221 | 11/1970 | Aupoix et al. | 174/15 C X |
| 3,515,793 | 6/1970 | Aupoix et al. | 174/15 C X |
| 3,514,524 | 5/1970 | Buchhold | 174/34 |
| 3,382,315 | 5/1968 | Minnich | 174/34 |

FOREIGN PATENTS OR APPLICATIONS

| | | | |
|---|---|---|---|
| 1,167,054 | 10/1969 | Great Britain | 174/15 C |
| 1,555,807 | 12/1968 | France | 174/DIG. 6 |
| 987,273 | 7/1949 | Germany | 174/29 |

*Primary Examiner*—Lewis H. Myers
*Assistant Examiner*—A. T. Grimley
*Attorney*—Spencer & Kaye

[57] ABSTRACT

An low-temperature cable which can be electrically joined to, and structurally connected to, a similar cable within an means. The cable has an electrical conductor formed of a plurality of helically wound individual conductor sections internally supported by spaced support means. Insulation is helically wound in layers about the electrical conductor. The frictional resistance to movement of the electrical conductor within the insulation and over the support means due to temperature changes is reduced because the radial contraction of the insulation is equal to or smaller than the radial contraction of the electrical conductor and the radial contraction of the support means is equal to or greater than that of the conductor.

9 Claims, 9 Drawing Figures

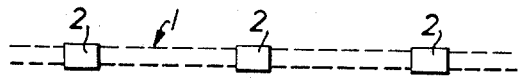
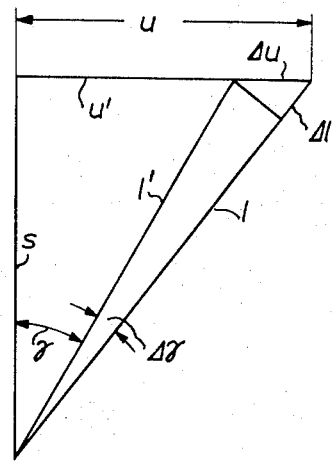
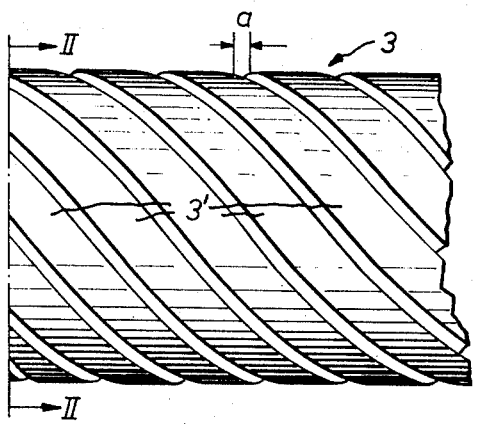
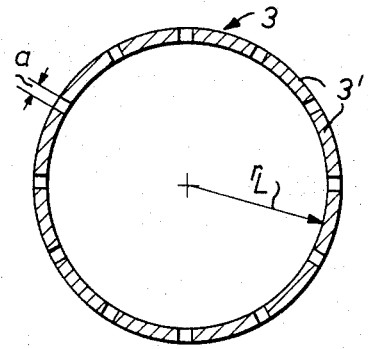
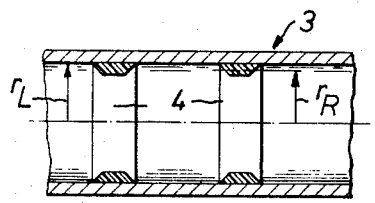
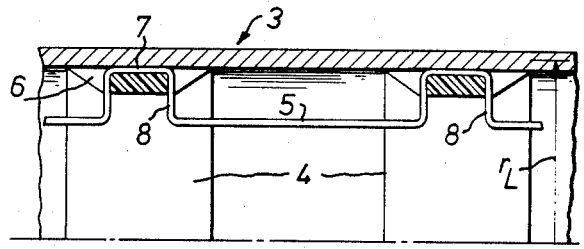
Inventors.
Theodor Adam Buchhold
Eduard Bochenek
BY Spencer & Kaye
ATTORNEYS

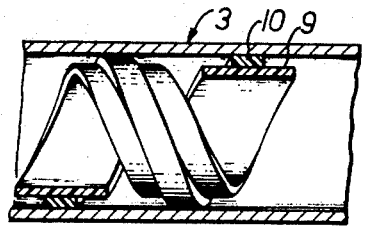
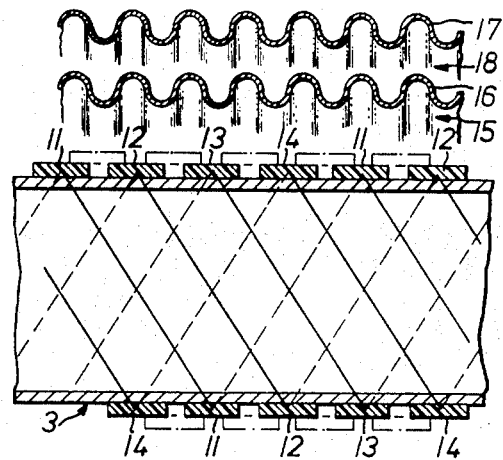
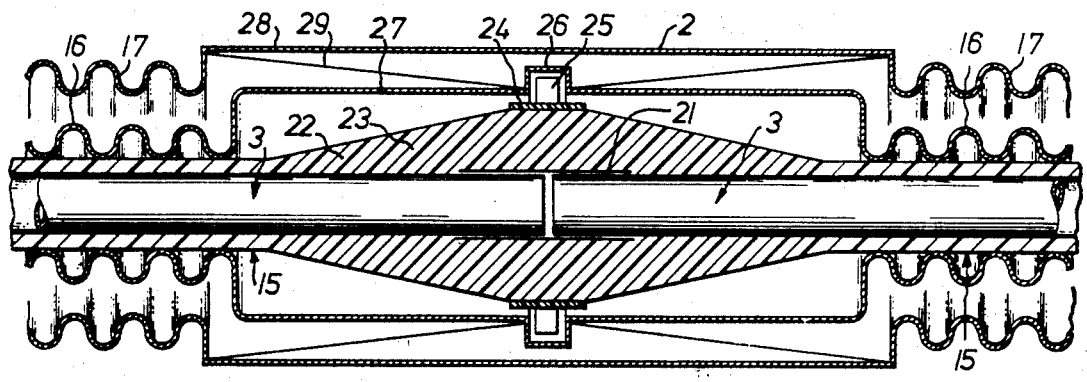

LOW-TEMPERATURE ELECTRICAL CABLE ARRANGEMENT

BACKGROUND OF THE INVENTION

It is known to construct low-temperature electrical cables with an outer corrugated tube which concentrically surrounds an inner core. This inner core also has a corrugated tube which is spaced from the outer tube and this space is filled with a suitable thermal insulation. Within the inner corrugated tube there is the electrical conductor which is wrapped in insulation and which is cooled by the flow of a suitable coolant.

Electrical cables now in use consist of at least two concentric sheaths of conductive metal and a wound insulation. With this arrangement the electrical conductor is substantially in the shape of at least one helix to which a sheathing of insulation is applied. The ratio of the coefficients of expansion and contraction of the conductor and of the insulating material is so selected that the insulating sheathing exerts a pressure on this helix when the temperature changes and thus effects an extension or shortening which compensates for the effect of the temperature change. The conductor consists of a plurality of helical, spaced individual conductor sections so that a change in temperature will not affect the length of the cable because there is a simultaneous change in the lead angle and diameter of the helical windings. This is disclosed in German application, Ser. No. 1,814,036.

In the electrical cable, as now used, the layers of insulation in the sheathing are closely pressed together. This causes problems at the terminals when the cable expands or contracts in response to temperature changes. Thus, with the layers of insulation pressed together and against the conductor, the assembly acts as massive bodies and strong forces are produced in the body and at the terminals when such temperature changes occur.

SUMMARY OF THE INVENTION

It is an object of the invention to provide an arrangement of support elements for the conductor in an electrical cable, which, with a different type of insulation sheathing, will alleviate the problems now encountered when cable is exposed to temperature changes.

This is accomplished according to the present invention by providing supporting elements within the conductor which are of material which has a radial thermal contraction that is greater than or equal to the radial contraction of the conductor. In a similar cable core the insulation tape provided has a radial thermal contraction which is less than or equal to that of the conductor. Further, the pitch of the tape insulation used in the cable is less than the pitch of the individual conductors. At certain distances the cable has to anchored.

BRIEF DESCRIPTION OF THE DRAWINGS

FIG. 1 shows diagramatically a plurality of cable sections as secured together as anchors.

FIG. 2 is a side elevation view of a part of the electrical conductor portion of a cable and showing the spaced, helically wound individual conductor sections.

FIG. 2a is a cross-sectional view taken along the line II—II of FIG. 1.

FIG. 3 shows the center line of one of the helically wound individual conductor sections cut open longitudinally along one pitch length of the cylinders and spread out.

FIG. 4 is a sectional view of one of the conductor sections with support elements therein.

FIG. 5 is a view similar to FIG. 4, but showing mounting members for the support elements.

FIG. 6 is also a view similar to FIG. 4, but showing another embodiment of the support elements.

FIG. 7 is a partial sectional view of a helically wound individual conductor section with applied insulation and within corrugated tubes.

FIG. 8 is a side view, partially in section, showing an anchor for the cable.

DESCRIPTION OF THE PREFERRED EMBODIMENTS

As seen in FIG. 1, a cable generally indicated at 1, is anchored by a plurality of spaced anchors 2. A conductor portion of the cable is seen in FIG. 2 and is generally indicated at 3. The conductor 3 consists in a known manner of a plurality of helically wound, individual conductor sections 3' which are spaced from one another at a spacing $a$. During a contraction the individual helical conductor sections act like helical springs which are held at their terminals or ends. The resulting forces will be small unless the pitch length is very long and the individual conductor sections are very thick.

Even though the resultant forces are small during a time of contraction, as mentioned above, it is important also that during such contraction the movement of the individual conductor sections not be unnecessarily impeded by friction. Before proceeding further with a description of the invention it will be helpful to understand how the helical section behaves when it contracts and attention is directed to FIG. 3.

The circumference of the conductor cylinder is $u = 2\pi r_L$ where $r_L$ is the radius of the conductor as seen in FIG. 2a. If length $l$ is shortened by $\Delta l = \alpha_L l$, where $\alpha_L$ is the contraction coefficient of the conductor material, $l$ becomes the shorter length $l'$ and the circumference $u$ becomes $u'$ and is smaller by $\Delta u$.

The following equations can be derived:

$$\frac{\Delta u}{u} = \frac{\Delta r_L}{r_L} = \frac{\Delta l}{1}\left(1 + \frac{s^2}{u^2}\right) = \alpha_L\left(1 + \frac{s^2}{u^2}\right)$$

$$\alpha_L = \frac{\Delta l}{1}$$

$$\Delta r_L = \alpha_L r_L + \alpha_L r_L \frac{s^2}{u^2} \qquad \text{Equation 1}$$

where $s$ is the pitch length, i.e., the axial length of one turn, of a conductor section 3'.

Equation 1 shows that the radius $r_L$ decreases by $\alpha_L r_L (s^2/u^2)$ in addition to $\alpha_L r_L$, the latter term corresponding to the contraction of a cylindrical conductor without helical individual conductor sections. This is also the reason why the individual conductor sections must be arranged with a spacing between each other. It can also be seen that during the contraction lead angle $\gamma$ is reduced by $\Delta \gamma$.

As can be seen from FIG. 4, the individual conductor sections 3' of the conductor 3 are supported, for example by rings 4. It should be mentioned here that to simplify the figures for purposes of description of the invention no attempt has been made to show each of the spaces $a$ between the conductor sections 3'. Since the individual conductor section 3' will rotate through an angle $\Delta \gamma$ against the rings 4 during contraction, friction results which must be kept small. The contact pressure between the individual conductor section 3' and rings 4 must be as low as possible. In order to meet these requirements, rings 4 with radius $r_R$ are so constructed that their contraction $\Delta r_R = \alpha_R r_R$, where $\alpha_R$ is the contraction coefficient of the ring material, is at least equal to or, preferably, somewhat greater than the contraction $$\alpha_L r_L \left(1 + \frac{s^2}{u^2}\right)$$

of the individual conductor sections 3', i.e. when $r_L \approx r_R$, $$\alpha_R \geq \alpha_L \left(1 + \frac{s^2}{u^2}\right) \qquad \text{Equation 2}$$

This means that the thermal contraction coefficient $\alpha_R$ of the rings 4 must be greater than the contraction coefficient $\alpha_L$ of the conductor material. Insulating materials have a contraction coefficient up to 3 percent and such a pitch(s) for the conductor is selected which meets the condition $\Delta r_R \geq \Delta r_L$. In practice $\Delta r_R$ is advisably somewhat greater than $\Delta r_L$.

In order to have the rings 4 at the proper axial spacing, e.g., between 5 and 10 cm, before installation, they may be connected together by means of wires 5 as shown in FIG. 5. Three or four such wires 5 may be distributed around the inner periphery of the conductor section. The rings in this case are provided with slits 6 in which the wires rest and a groove 7 to hold wires 5. If the wires 5 are bent with a slight bias at 8, there is sufficient contact with the rings to permit winding of the conductor turns.

During cooling, the contraction of the wire 5 must be absorbed by a bending elasticity, for example that at 8, so that the longitudinal forces produced do not become too great. Greater elasticity is realized when the wire is bent upward and backward closely behind 8.

FIG. 6 shows another type of support for the conductor. This is a helix 9 of a synthetic material, its thermal contraction coefficient, $\alpha_W$ and pitch length $s_W$ in the axial direction being so selected that the following equation results:

$$\alpha_W \left(1 + \frac{s_W^2}{u^2}\right) \geqq \alpha_L \left(1 + \frac{s^2}{u^2}\right) \qquad \text{Equation 3}$$

A narrow helix of synthetic material has too great a longitudinal elasticity with respect to the fabrication of the cable, which may be reduced by wider turns. However, this hampers the access of the coolant to the conductor. Cooling may be improved if a narrow helix 10 is applied on top of the wide helix 9.

The conductor is arranged to be concentric to the center of a suitably dimensioned corrugated tube and supported by insulator portions if it is to be electrically insulated by the coolant.

Better insulation is obtained by strips of paper or synthetic material which wind around the conductor in the form of a helix. Since during cooling the individual conductor sections 3' rotate at each point by $\Delta\gamma$, friction results between these conductor sections and the innermost insulation layer, the friction being only slight when the contact pressure on the partial conductors is held low. If the strips have the contraction coefficient $\alpha_B$ and the pitch length $s_B$, the following must apply in order to keep the friction low for the innermost insulation layer:

$$\Delta r_B \leqq \Delta r_L$$

or $$\alpha_B \left(1 + \frac{s_B^2}{u^2}\right) \leqq \alpha_L \left(1 + \frac{s^2}{u^2}\right) \qquad \text{Equation 4}$$

Since for synthetics $\alpha_B$ is greater than $\alpha_L$, the pitch length $s_B$ of the strips must be substantially smaller than that of the individual conductor sections 3'. Paper strips have very little contraction, for example as compared to the order of magnitude of that for metal. If the equal sign is placed in Equation 4, this requires a long pitch length $s_B$, which is not advisable for practical reasons. It is better to select a shorter pitch length so that a little play results between insulation and conductor during cooling and the contraction of the insulation can develop without too much friction with respect to the conductor. If adjacent layers of the strips have oppositely directed pitches, the relative rotation is $2 \Delta\gamma$. In order to permit such a mutual rotation, the friction between the tapes, i.e., the coefficient of friction, must be small.

The coefficient of friction for paper is higher at low temperatures than, for example, that of polytetrafluoroethylene against polytetrafluoroethylene or that of polytetrafluoroethylene against paper. This favorable property of polytetrafluoroethylene can be utilized if thin films of polytetrafluoroethylene are applied on one or both sides of a thicker paper tape. Spraying is also possible.

It can be shown that broad bands are not suitable but rather that it is more favorable for reduced friction to use a plurality of parallel tapes for a given pitch length as shown in FIG. 7. The insulating tapes 11, 12, 13 and 14 of one layer lie next to one another with very little space therebetween. A plurality of such layers are employed, which is not shown.

During cooling, a tape thickness d produces a total play of $d\alpha_B$ ($s^2/u^2$) between the tapes which is favorable for reasons of friction. The pitch length $s_B$ should thus not be selected too short. It is further advisable for the tapes of the outer insulating layers to have a somewhat shorter pitch length than the tapes of the lower layers.

As further shown in FIG. 7, conductor 3 together with its insulation, generally indicated at 15, is disposed in the interior of a corrugated tube 16. This tube is so elastic that the forces produced by the contraction are only slight at the points of anchorage. The corrugated tube 16 is disposed within a further corrugated tube 17 which is at normal temperature. The space, generally indicated at 18, is evacuated and filled with a super heat insulation (not shown) in order to keep the access of heat to the cable as low as possible.

FIG. 8 shows an anchor 2 in which the terminals of the two conductors 3 are connected together by welding or by strips 21 of a highly conductive material. The tape insulation 15 is reinforced at the sleeve in a known club shape as indicated at 22. In the closely hatched zone 23 the insulating tapes are glued together and to conductors 3 so that a firm connection exists between the insulation 15 and the conductors 3. A tension tape 24 with several protrusions 25 encases the club. The protrusions 25 extend into a channel 26 of a housing 27 which is connected with the corrugated tubes 16. The outer corrugated tubes 17 are connected with a housing 28 which is at ambient temperature whereas housing 27 is at a low temperature. A vacuum exists between the two housings. The anchorage of housing 27 and thus of the cable with respect to housing 28 is realized by tension wires 29 which have poor heat conducting property. The wires may be of stainless steel or a suitable synthetic material.

It will be understood that the above description of the present invention is susceptible to various modifications, changes and adaptations, and the same are intended to be comprehended within the meaning and range of equivalents of the appended claims.

We claim:

1. A low-temperature electrical cable which is adapted to be held at spaced intervals along its length, comprising in combination:
   a. a cylindrically shaped electrical conductor formed with a plurality of helically wound individual conductor sections which are spaced from each other;
   b. support means which are internally positioned and spaced from one another within said electrical conductor to support said sections, said support means having a radial thermal contraction, which, when subjected to a temperature change, is equal to or greater than the corresponding radial contraction of said conductor; and
   c. insulation means helically wound about the circumference of said conductor, said insulation means having a radial thermal contraction which, when subjected to a temperature change effecting said electrical conductor and said support means, is equal to or smaller than the radial contraction of said conductor.

2. A low-temperature electrical cable as defined in claim 1 wherein each pitch length of said insulation means consists of a plurality of spaced parallel strips of tape material.

3. A low-temperature electrical cable as defined in claim 2 wherein the tape material is polytetrafluoroethylene.

4. A low-temperature electrical cable as defined in claim 2 wherein said insulation means consist of a plurality of layers of said strips and the pitch length varies from layer to layer.

5. A low-temperature electrical cable as defined in claim 1 wherein said support means consist of rings.

6. A low-temperature electrical cable as defined in claim 5 wherein said rings are connected together in spaced relationship by wire means.

7. A low-temperature electrical cable as defined in claim 1 wherein said support means consists of a helix.

8. A low-temperature electrical cable as defined in claim 7 wherein said helices each comprise a relatively wide base portion which has a narrower helix portion superimposed thereon and said narrower helix portion is adapted to engage the inner wall surfaces of said sections of said conductor.

9. A low-temperature electrical cable as defined in claim 1 further comprising anchor means securing said conductor and said insulation means at positions spaced along the length of said cable.

* * * * *